United States Patent
Jang et al.

(10) Patent No.: US 11,381,277 B2
(45) Date of Patent: Jul. 5, 2022

(54) DEVICE AND METHOD FOR ADAPTIVELY CONTROLLING PREAMBLE IN UWB NETWORK

(71) Applicant: Samsung Electronics Co., Ltd., Gyeonggi-do (KR)

(72) Inventors: Jonghoon Jang, Gyeonggi-do (KR); Yi Yang, Gyeonggi-do (KR); Moonseok Kang, Gyeonggi-do (KR); Hyunchul Kim, Gyeonggi-do (KR); Jonghyo Lee, Gyeonggi-do (KR); Sehwan Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/273,933

(22) PCT Filed: May 10, 2019

(86) PCT No.: PCT/KR2019/005663
§ 371 (c)(1),
(2) Date: Mar. 5, 2021

(87) PCT Pub. No.: WO2020/050473
PCT Pub. Date: Mar. 12, 2020

(65) Prior Publication Data
US 2021/0314022 A1 Oct. 7, 2021

(30) Foreign Application Priority Data
Sep. 7, 2018 (KR) .................. 10-2018-0107046

(51) Int. Cl.
*H04B 1/7163* (2011.01)
*H04W 4/02* (2018.01)

(52) U.S. Cl.
CPC ........ *H04B 1/71632* (2013.01); *H04W 4/023* (2013.01)

(58) Field of Classification Search
CPC .... H04B 1/71632; H04W 4/023; H04W 4/80; H04L 1/00; H04L 29/08; H04L 1/0028; H04L 1/0007; H04L 1/0017; H04L 69/323
(Continued)

(56) References Cited

U.S. PATENT DOCUMENTS 8,436,758 B2  5/2013  McLaughlin et al.
8,437,432 B2  5/2013  McLaughlin et al.
(Continued)

FOREIGN PATENT DOCUMENTS

WO    WO2016023600    2/2016

OTHER PUBLICATIONS

PCT/ISA/210 Search Report issued on PCT/KR2019/005663, dated Sep. 4, 2019, pp. 5.
(Continued)

*Primary Examiner* — Fitwi Y Hailegiorgis
(74) *Attorney, Agent, or Firm* — The Farrell Law Firm, P.C.

(57) ABSTRACT

An electronic device for supporting an ultra wide band (UWB) protocol transmits first data, including mode information indicating whether the electronic device supports a mode associated with control of a preamble and a preamble having a first length, to an external electronic device circuit, receives second data including mode information indicating whether the external electronic device supports the mode associated with the control of the preamble from the external electronic device, and controls a length of the preamble, based on the mode information included in the second data.

15 Claims, 11 Drawing Sheets

(58) Field of Classification Search
USPC .......................................................... 375/140
See application file for complete search history.

(56) References Cited

U.S. PATENT DOCUMENTS

| | | |
|---|---|---|
| 9,806,977 B2 | 10/2017 | Waheed et al. |
| 10,038,472 B2 | 7/2018 | McLaughlin et al. |
| 10,084,507 B2 | 9/2018 | McLaughlin et al. |
| 10,090,879 B2 | 10/2018 | McLaughlin et al. |
| 10,749,778 B2 | 8/2020 | Thompson et al. |
| 10,756,998 B2 | 8/2020 | Waheed et al. |
| 2007/0060079 A1* | 3/2007 | Nakagawa ................ G01S 5/06 455/131 |
| 2007/0253400 A1* | 11/2007 | Zumsteg .............. H04B 7/2125 370/350 |
| 2014/0269666 A1 | 9/2014 | Marsh et al. |
| 2017/0034027 A1 | 2/2017 | Thompson et al. |
| 2017/0126533 A1 | 5/2017 | Waheed et al. |
| 2017/0272119 A1 | 9/2017 | McLaughlin et al. |
| 2018/0041414 A1 | 2/2018 | Waheed et al. |
| 2020/0412631 A1 | 12/2020 | Thompson et al. |

OTHER PUBLICATIONS

PCT/SA/237 Written Opinion issued on PCT/KR2019/005663, dated Sep. 4, 2019, pp. 5.
Sahinoglu, Zafer et al., "Ranging in the IEEE 802.15.4a Standard", Apr. 23, 2007, pp. 8.

* cited by examiner

| Bits: 0-1 | 2-8 | 9 | 10 | 11-12 | 13-18 |
|---|---|---|---|---|---|
| Data Rate | Frame length | Ranging | Reserved | Preamble duration | SECDED |

501

| Bits: 0-1 | 2-10 | 11 | 12 | 13-18 |
|---|---|---|---|---|
| Data Rate | Frame length | Ranging | Preamble Mode | SECDED |

502

| Bits: 0-1 | 2-11 | 12 | 13-18 |
|---|---|---|---|
| Data Rate | Frame length | Preamble Mode | SECDED |

503

| Bits: 0 | 1-10 | 11 | 12 |
|---|---|---|---|
| Reserved | Frame length | Ranging | Preamble Mode |

DEVICE AND METHOD FOR ADAPTIVELY CONTROLLING PREAMBLE IN UWB NETWORK

PRIORITY

This application is a National Phase Entry of PCT International Application No. PCT/KR2019/005663, which was filed on May 10, 2019, and claims priority to Korean Patent Application No. 10-2018-0107046, which was filed on Sep. 7, 2018, the entire content of each of which is incorporated herein by reference.

TECHNICAL FIELD

Various embodiments disclosed in the disclosure relate to an apparatus and a method for adaptively controlling a preamble in an ultra wide band (UWB) network.

BACKGROUND ART

An electronic device may perform wireless communication with an external electronic device using a UWB network. The UWB network may refer to a wireless communication technology where data is transmitted over an ultra wide band frequency band. The UWB network may be based on the institute of electrical and electronic engineers (IEEE) 802.15 standard specification defined by IEEE.

DISCLOSURE OF INVENTION

Technical Problem

IEEE 802.15.4 (or IEEE 802.15.4a) defines a structure of a physical (PHY) layer packet transmitted over a UWB network. According to the standard specification, a channel impulse response (CIR) of a preamble included in the PHY layer packet may be used to measure a distance between an electronic device and an external electronic device. The longer the length of the preamble, the more accurate the measurement result of distance. When the length of the preamble is determined by the electronic device or the external electronic device when data communication starts, the determined length of the preamble may be fixed until the data communication between the electronic device and the external electronic device ends. The length of the preamble may be, for example, 16 to 4096 (unit: symbol).

Because the state of wireless communication between the electronic device and the external electronic device is variable, when the length of the preamble is fixed, there may occur degradation in power consumption or communication performance. For example, when the wireless communication between the electronic device and the external electronic device is in a line of sight (LOS) state, because it is able for the accuracy of distance measurement to be high although the length of the preamble is not long, there may be an increase in power consumption and latency when the length of the preamble is long. On the other hand, when the wireless communication is in non line of sight (NLOS) where diffraction or reflection of radio waves occurs, the shorter the length of the preamble, the more the accuracy of distance measurement decreases.

Various embodiments disclosed in the disclosure may provide an apparatus and a method for adaptively controlling a length of a preamble in a UWB network.

Solution to Problem

In accordance with an aspect of the disclosure, an electronic device supporting an ultra wide band (UWB) protocol is provided. The electronic device may include at least one wireless communication circuit and a processor operatively connected with the at least one wireless communication circuit. The processor may be configured to transmit first data, including mode information indicating whether the electronic device supports a mode associated with control of a preamble and a preamble having a first length, to an external electronic device, via the at least one wireless communication circuit, receive second data including mode information indicating whether the external electronic device supports the mode associated with the control of the preamble from the external electronic device, via the at least one wireless communication circuit, measure a distance between the electronic device and the external electronic device using the preamble having the first length, when the external electronic device does not support the mode associated with the control of the preamble, based on the mode information included in the second data and measure a distance between the electronic device and the external electronic device using a preamble having a second length different from the first length, when the external electronic device supports the mode associated with the control of the preamble, based on the mode information included in the second data.

In accordance with another aspect of the disclosure, an electronic device is provided. The electronic device may include a first wireless communication circuit configured to support a first protocol, a second wireless communication circuit configured to support a second protocol, and a processor configured to be operatively connected with the first wireless communication circuit and the second wireless communication circuit. The processor may be configured to transmit first data, including mode information indicating whether the electronic device supports a mode associated with control of a preamble and a preamble having a first length, to an external electronic device, via the second wireless communication circuit, receive second data including mode information indicating whether the external electronic device supports the mode associated with the control of the preamble from the external electronic device, via the second wireless communication circuit, measure a distance between the electronic device and the external electronic device using the preamble having the first length, via the first wireless communication circuit, when the external electronic device does not support the mode associated with the control of the preamble, based on the mode information included in the second data, and measure a distance between the electronic device and the external electronic device using a preamble having a second length different from the first length, via the first wireless communication circuit, when the external electronic device supports the mode associated with the control of the preamble, based on the mode information included in the second data.

In accordance with another aspect of the disclosure, an electronic device supporting a UWB protocol is provided. The electronic device may include at least one wireless communication circuit and a processor operatively connected with the at least one wireless communication circuit. The processor may be configured to receive first data, including mode information indicating whether an external electronic device supports a mode associated with control of a preamble and a preamble having a first length, from the external electronic device, via the at least one wireless communication circuit, transmit second data including mode information indicating whether the electronic device supports the mode associated with the control of the preamble to the external electronic device, via the at least one wireless communication circuit, measure a distance between the electronic device and the external electronic device using the preamble having the first length, when the electronic device does not support the mode associated with the control of the preamble, based on the mode information included in the second data, and measure a distance between the electronic device and the external electronic device using a preamble having a second length different from the first length, when the electronic device supports the mode associated with the control of the preamble, based on the mode information included in the second data.

Advantageous Effects of Invention

According to various embodiments disclosed in the disclosure, the electronic device may adaptively control a preamble of a data packet transmitted over the UWB network, thus reducing power consumption and latency.

According to various embodiments disclosed in the disclosure, the electronic device may adaptively control a preamble of a data packet transmitted over the UWB network, thus enhancing accuracy of distance measurement.

In addition, various effects ascertained directly or indirectly through the disclosure may be provided.

BRIEF DESCRIPTION OF DRAWINGS

FIG. 5 illustrates a structure of a PHY header (PHR) according to various embodiments;

With regard to description of drawings, the same or similar denotations may be used for the same or similar components.

BEST MODE FOR CARRYING OUT THE INVENTION

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Figure 1:
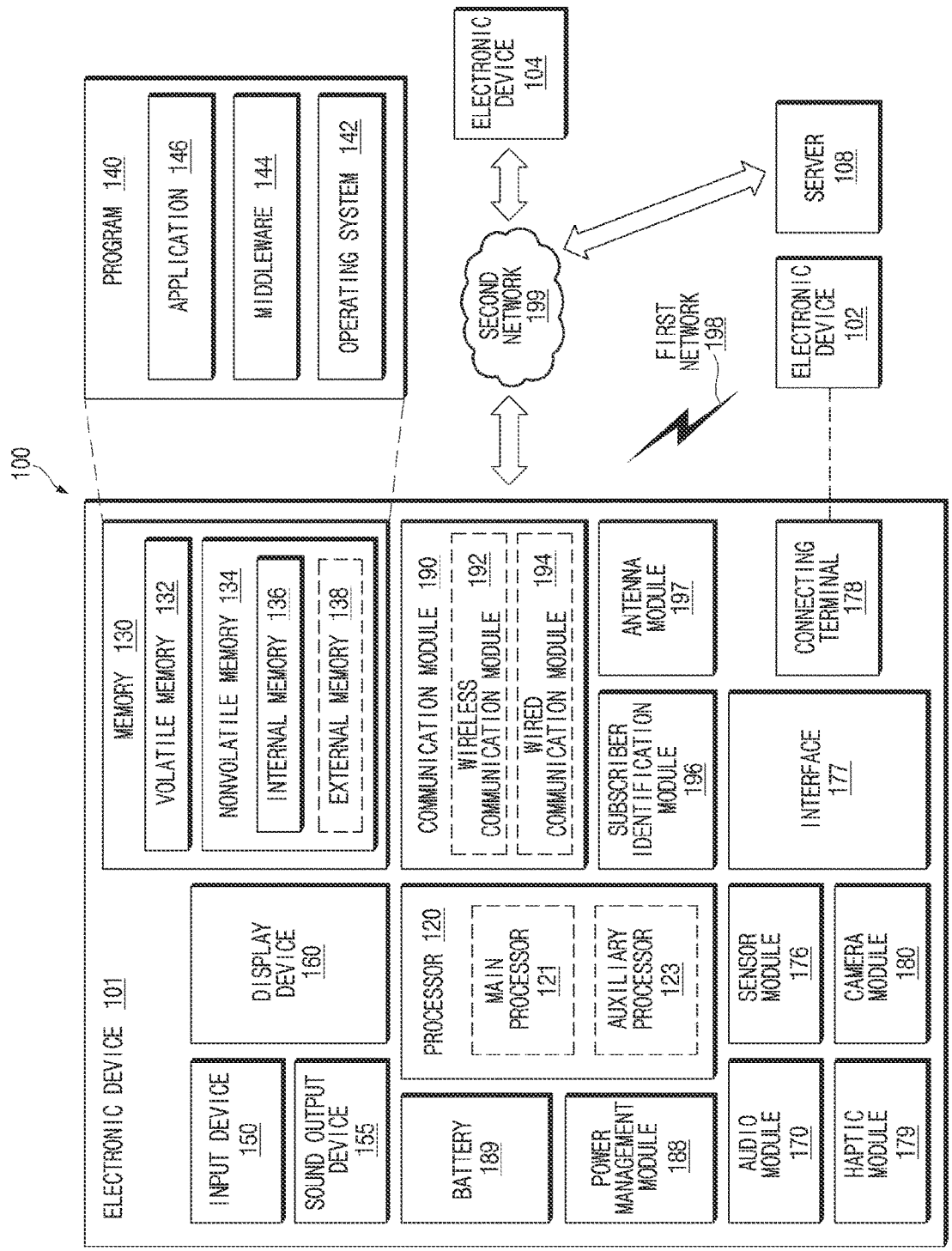
FIG. 1 is a block diagram illustrating an electronic device in a network environment according to various embodiments.

FIG. 1 is a block diagram of an electronic device 101 in a network environment 100 according to various embodiments.

Referring to FIG. 1, the electronic device 101 may communicate with an electronic device 102 through a first network 198 (e.g., a short-range wireless communication network) or may communicate with an electronic device 104 or a server 108 through a second network 199 (e.g., a long-distance wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device). According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
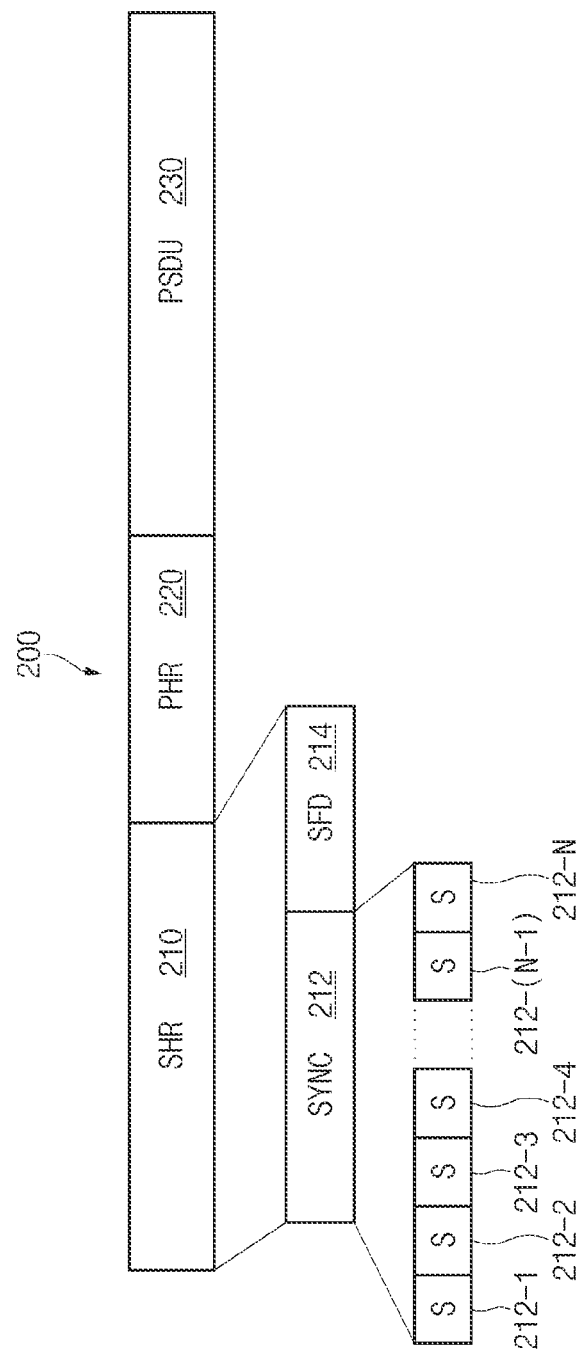
FIG. 2 illustrates a structure of a physical (PHY) layer packet based on the institute of the electrical and electronic engineers (IEEE) 802.15.4 standard specification according to various embodiments.

FIG. 2 illustrates a structure of a physical (PHY) layer packet 200 based on the IEEE 802.15.4 standard specification according to various embodiments.

According to an embodiment, an electronic device (e.g., an electronic device 101 of FIG. 1) may transmit or receive data with an external electronic device (e.g., an electronic device 102 of FIG. 1) based on a UWB protocol. The UWB protocol may use a bandwidth of an ultra wide band. The IEEE 802.15.4 standard specification defines a structure of the PHY layer packet (e.g., 200).

Referring to FIG. 2, the PHY layer packet 200 may include a synchronization header (SHR) 210, a PHY header (PHR) 220, and a PHY service data unit (PSDU) 230.

According to an embodiment, the SHR 210 may be added prior to the PHR 220. The SHR 210 may be used for at least one of an automatic gain control (AGC) setting, antenna diversity selection, timing acquisition, coarse and fine frequency recovery, packet and frame synchronization, channel estimation, or ranging procedure. The ranging procedure may include an operation of measuring a distance between the electronic device and the external electronic device. The SHR 210 may include a synchronization (SYNC) 212 and a start-of-frame delimiter (SFD) 214.

According to an embodiment, the PHR 220 may be added after the SHR 210. The PHR 220 may include control information associated with the PHY layer packet 200. For example, the PHR 220 may include at least one of a data rate used to transmit the PSDU 230, a duration of a preamble (e.g., the SYNC 212), a length of the PSDU 230, or information for detecting an error of the PHR 220. According to an embodiment, the PHR 220 may consist of 19 bits.

According to an embodiment, the PSDU 230 may include data (or content data) to be transmitted or received by the electronic device and the external electronic device. According to an embodiment, the PSDU 230 may consist of 0 byte to 127 bytes.

According to an embodiment, the SYNC 212 may be composed of a plurality of symbols (e.g., 212-1, 212-2, 212-3, . . . , and 212-N) (where N is a natural number). The plurality of symbols may be a series of sequence codes composed of 0, −1, or 1. The SYNC 212 may be referred to as a preamble. According to an embodiment, the length of the SYNC 212 may be at least one of 16 to 4096 (unit: symbol).

According to an embodiment, the electronic device may measure a distance between the electronic device and the external electronic device using the SYNC 212 (or the preamble). For example, the electronic device may identify a first path (or a first pulse) in a channel impulse response (CIR) of the SYNC 212. When the first path is identified in the CIR of the SYNC 212, the electronic device may identify a time when one of bits forming the PHR 220 is received as a time when data is transmitted (or received). The time when the data is transmitted or received may be referred to as a timestamp. The electronic device may measure a distance between the electronic device and the external electronic device using a time indicated by the timestamp.

According to an embodiment, because the longer the length of the preamble, the more the accuracy of measuring the CIR increases, the electronic device may accurately measure the distance, whereas power consumption or latency (or channel busy) may increase. The shorter the length of the preamble, the more the power consumption and the latency decreases, whereas the more the accuracy of distance measurement decreases. The electronic device according to an embodiment may control the length of the preamble based on the state of the wireless communication between the electronic device and the external electronic device or the data rate to reduce power consumption, reduce latency, and increase accuracy of distance measurement. The state of the wireless communication may be determined based on at least one of, for example, the confidence level (CL) defined in the IEEE 802.15.4 standard specification or the ratio of the first path to noise.

According to an embodiment, the SFD 214 may be used for frame timing. The SFD 214 may be composed of a plurality of symbols.

Figure 3:
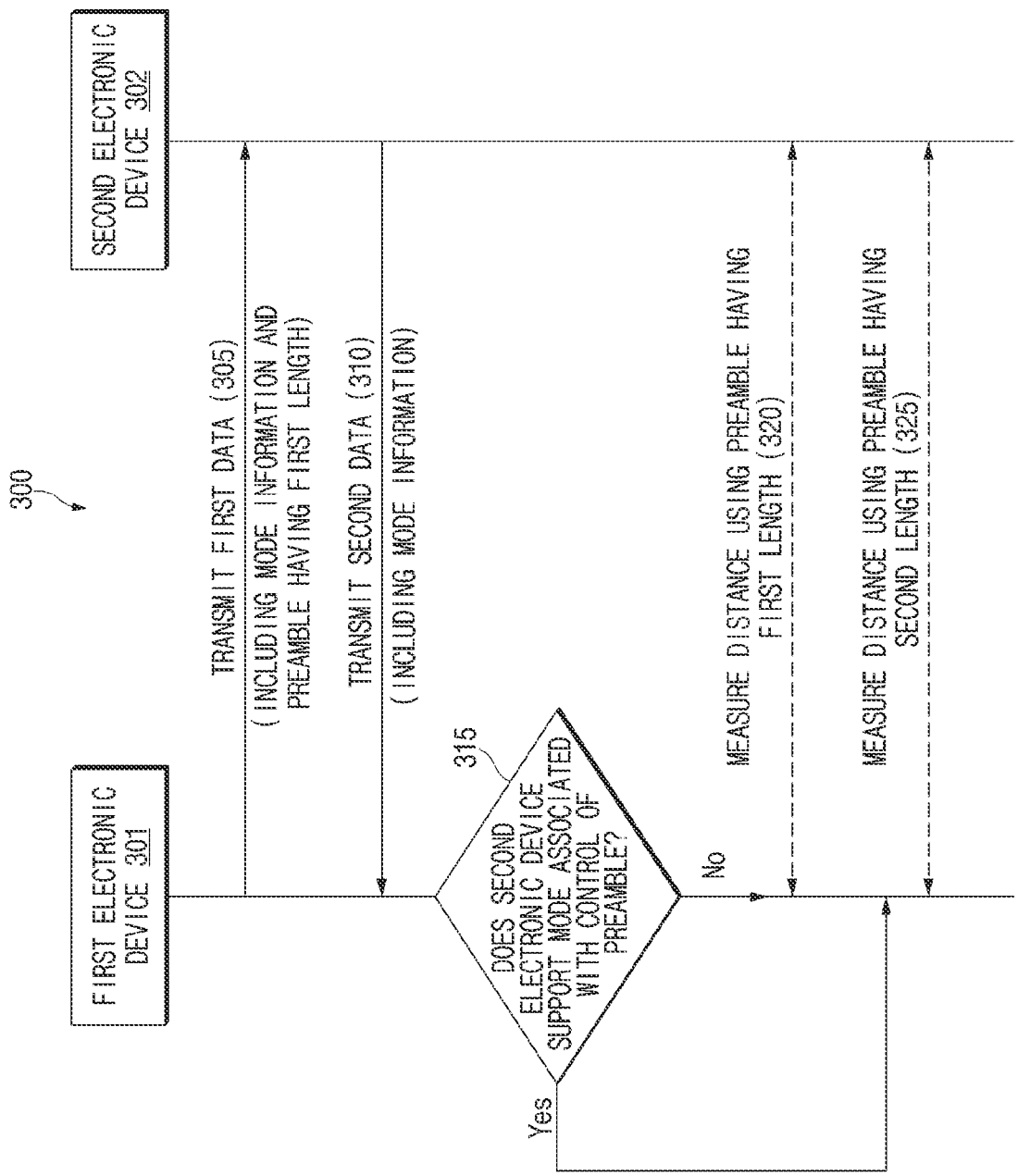
FIG. 3 illustrates a signal sequence diagram between electronic devices for controlling a length of a preamble according to various embodiments.

FIG. 3 illustrates a signal sequence diagram 300 between electronic devices 301 and 302 for controlling a length of a preamble (e.g., a SYNC 212 of FIG. 2) according to various embodiments. The first electronic device 301 and the second electronic device 302 shown in FIG. 3 may include the same components as the components of the electronic device 101 of FIG. 1 or may perform the same operation as the electronic device 101 of FIG. 1 In an embodiment, an operation (e.g., operation 320 or operation 325) displayed by a dotted line among operations shown in FIG. 3 may fail to be performed. For example, when operation 320 is performed, operation 325 may fail to be performed. When operation 325 is performed, operation 320 may fail to be performed.

Referring to FIG. 3, in operation 305 of the signal sequence diagram 300, the first electronic device 301 may transmit first data to the second electronic device 302. According to an embodiment, the first data may include at least a portion of a PHY layer packet 200 of FIG. 2. For example, the first data may include a preamble having a first length.

According to an embodiment, the first length of the preamble included in the first data may be 16 symbols, 64 symbols, 1024 symbols, or 4096 symbols according to the IEEE 802.15.4 standard specification. According to an embodiment, the first length may be determined by an upper layer (e.g., an upper layer 410 of FIG. 4) of a PHY layer prior to operation 305 or may be preset by the first electronic device 301 and the second electronic device 302. According to an embodiment, the first length may be determined based on a predetermined data rate between the first electronic device 301 and the second electronic device 302. For example, a relationship between the data rate and the length (e.g., the first length) of the preamble may be represented as Table 1 below.

TABLE 1

| Data Rate | Length of Preamble (Unit: Symbol) |
| --- | --- |
| 27 Mbps | 16 |
| 6.8 Mbps | 64 |
| 850 kbps | 1024 |
| 110 kbps | 4096 |

According to an embodiment, the first data may include mode information associated with control of the preamble. The control of the preamble may refer to, for example, an operation where the first electronic device 301 or the second electronic device 302 changes the length of the preamble while data transmission between the first electronic device 301 and the second electronic device 302 is performed. The mode information associated with the control of the preamble, which is included in the first data, may indicate information about whether the electronic device 301 supports a mode associated with the control of the preamble (in other words, whether it is able for the first electronic device 301 to transmit or receive the preamble of the length changed during the data transmission) or whether the electronic device 301 does not support the mode associated with the control of the preamble. For example, the mode information associated with the control of the preamble, which is included in the first data, may consist of 1 bit. According to an embodiment, the mode information associated with the control of the preamble may be included in a PHR (e.g., 220 of FIG. 2) of a PHY layer packet (e.g., 200 of FIG. 2). An embodiment in which the mode information associated with the control of the preamble is included will be described below in FIG. 5.

According to an embodiment, the first electronic device 301 may set a frame length (e.g., a length of a PSDU 230 of FIG. 2) of the PHY layer packet included in the first data to 0 to reduce power consumption.

In operation 310, the second device 302 may transmit second data to the first electronic device 301. According to an embodiment, the second data may include mode information associated with control of a preamble of the second electronic device 302. Although not illustrated in FIG. 3, the second data may further include a preamble having the first length. According to an embodiment, the second electronic device 302 may set a frame length of a PHY layer packet included in the second data to 0 to reduce power consumption.

In operation 315, the first electronic device 301 may identify whether the second electronic device 302 supports a mode associated with the control of the preamble based on the mode information associated with the control of the preamble, which is included in the second data. When the second electronic device 302 does not support the mode associated with the control of the preamble (hereinafter, referred to as a static mode), in operation 320, the first electronic device 301 and the second electronic device 302 may measure a distance between the first electronic device 310 and the second electronic device 302 using the preamble having the first length.

When the second electronic device 302 supports the mode associated with the control of the preamble (hereinafter, referred to as a dynamic mode), in operation 325, the first electronic device 301 and the second electronic device 302 may measure the distance using a preamble having a second length different from the first length. For example, when the state of wireless communication between the first electronic device 301 and the second electronic device 302 is greater than or equal to a specified threshold value (e.g., a line of sight (LOS) state), the first electronic device 301 may set the length of the preamble to the second length shorter than the first length to reduce power consumption and latency. For another example, when the state of the wireless communication between the first electronic device 301 and the second electronic device 302 is less than the specified threshold value (e.g., a non line of sight (NLOS) state), the first electronic device 301 may set the length of the preamble to the second length longer than the first length to enhance accuracy of distance measurement.

According to an embodiment, the first electronic device 301 and the second electronic device 302 may repeatedly perform operations 305 to 325 to control the preamble depending on the state of the wireless communication. For example, the first electronic device 301 and the second electronic device 302 may perform operations 305 to 325 at a specified period and may perform operations 305 to 325 when data transmission starts.

Figure 4:
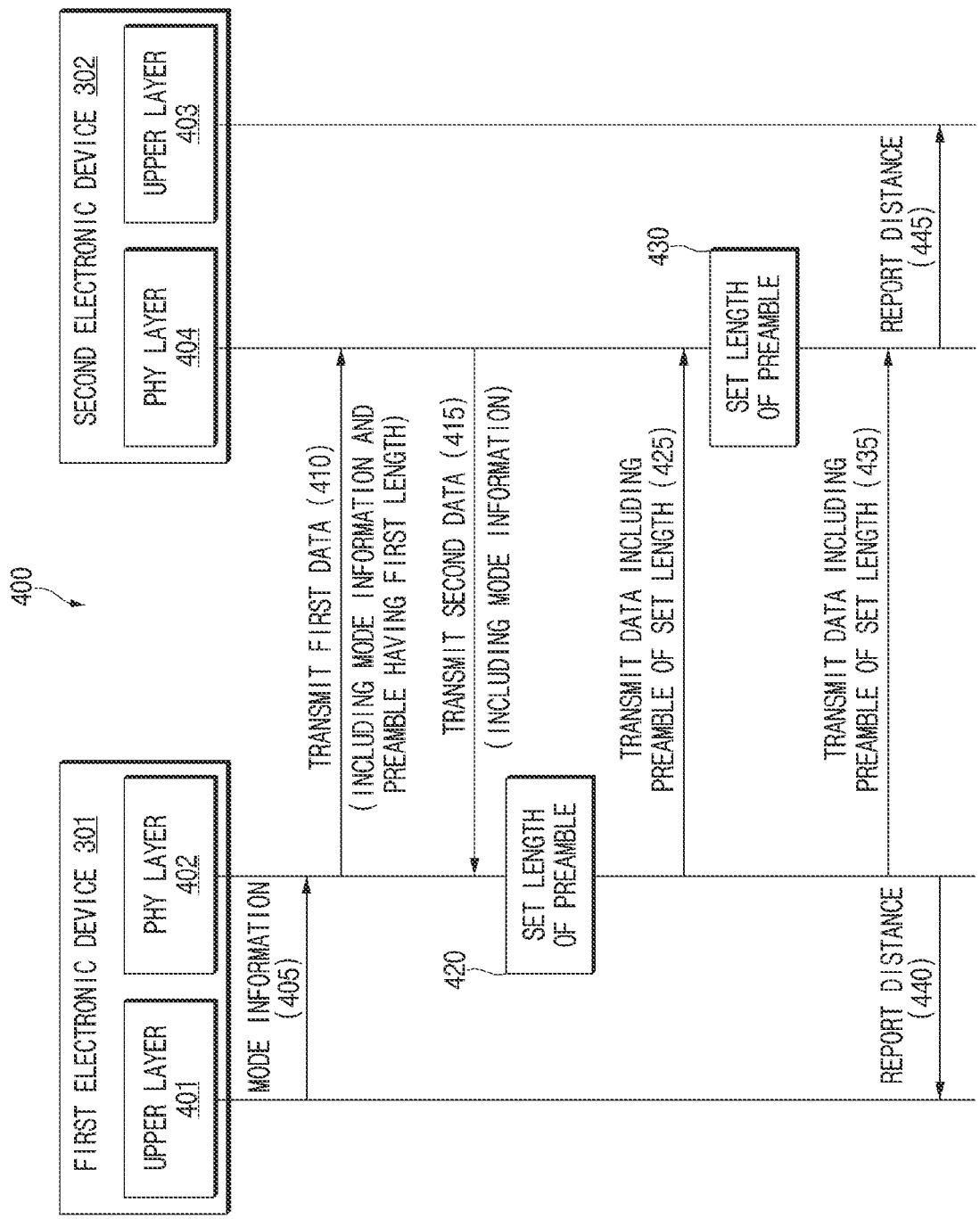
FIG. 4 illustrates a signal sequence diagram between electronic devices including upper layers and PHY layers configured to control a length of a preamble according to various embodiments.

FIG. 4 illustrates a signal sequence diagram 400 between electronic devices 301 and 302 including upper layers 401 and 403 and PHY layers 402 and 404 configured to control a length of a preamble (e.g., a SYNC 212 of FIG. 2) according to various embodiments. FIG. 4 assumes that the first electronic device 301 and the second electronic device 302 supports a mode associated with control of a preamble. According to an embodiment, the first electronic device 301 may include the upper layer 401 and the PHY layer 402, and the second electronic device 302 may include the upper layer 403 and the PHY layer 404.

Referring to FIG. 4, the upper layer 401 or 403 may include at least one of, for example, a medium access control (MAC) layer, a network layer, or an application layer (e.g., an application 146 of FIG. 1).

In operation 405, the upper layer 401 of the first electronic device 301 may transmit mode information associated with control of a preamble of the first electronic device 301 to the PHY layer 402. The mode information associated with the control of the preamble may indicate that, for example, the first electronic device 301 supports the mode associated with the control of the preamble. Although not illustrated in FIG. 4, the upper layer 401 may further transmit a CL value measured prior to operation 405 together with the mode information associated with the control of the preamble. The CL value measured prior to operation 405 may be referred to as a base CL value.

For example, attribute information delivered from the upper layer 401 to the PHY layer 402 may be represented as Table 2 below.

TABLE 2

| Attribute | Type | Range | Description |
|---|---|---|---|
| phyHrpUwbAdaptivepreambleLength Mode | Boolean | FALSE, TRUE | Whether to support a mode |
| pfyHrpUwbAdaptivePreambleLength Confidence Level | 3 bit | 55-99 | Base CL |

In operation 410, the PHY layer 402 of the first electronic device 301 may transmit the mode information associated with the control of the preamble received from the upper layer 401 by means of first data (e.g., operation 305 of FIG. 3). According to an embodiment, the first data may include a preamble having a first length. According to an embodiment, the first length may be determined by the upper layer 401 or may be determined by the PHY layer 402.

In operation 415, the PHY layer 404 of the second electronic device 302 may transmit second data including mode information associated with the control of the preamble of the second electronic device 302 to the PHY 402 (e.g., operation 310 of FIG. 3). The mode information associated with the control of the preamble may indicate that, for example, the second electronic device 302 supports the mode associated with the control of the preamble. According to an embodiment, the second data may include a preamble having the first length. Although not illustrated in FIG. 4, the PHY layer 404 may receive the mode information associated with the control of the preamble, which is included in the second data, from the upper layer 403 depending to the attribute described in Table 2.

In operation 420, the PHY layer 402 of the first electronic device 301 may set the length of the preamble. For example, the PHY layer 402 may set the length of the preamble to a second length different from the first length based on a state of wireless communication between the first electronic device 301 and the second electronic device 302. For another example, the PHY layer 402 may set the length of the preamble to the second length different from the first length based on a data rate between the first electronic device 301 and the second electronic device 302. For another example, the PHY layer 402 may set the length of the preamble to the second length different from the first length, based on the result of comparing the CL value included in the second data received from the second electronic device 302 with a specified value.

In operation 425, the PHY layer 402 of the first electronic device 301 may transmit data including the preamble of the set length to the PHY layer 404 of the second electronic device 302.

In operation 430, the PHY layer 404 of the second electronic device 302 may set the length of the preamble changed based on the received data. Although not illustrated in FIG. 4, the PHY layer 404 may measure a distance between the first electronic device 301 and the second electronic device 302 using the preamble of the data received in operation 425.

In operation 435, the PHY layer 404 of the second electronic device 302 may transmit data including the preamble of the set length to the PHY layer 402 of the first electronic device 301.

In operation 440, the PHY layer 402 of the first electronic device 301 may measure a distance between the first electronic device 301 and the second electronic device 302 using the preamble received from the PHY layer 404 of the second electronic device 302 and may report the measured distance to the upper layer 401 of the first electronic device 301.

In operation 445, the PHY layer 404 of the second electronic device 302 may report the measured distance to the upper layer 403 of the second electronic device 302. According to an embodiment, operation 445 may be performed between operation 425 and operation 435 as well as after operation 435.

FIG. 5 illustrates a structure of a PHY header (PHR) 220 according to various embodiments. The PHY 220 shown in FIG. 5 may refer to the PHR 220 included in first data or second data of FIG. 3.

Referring to FIG. 5, a first structure 501 indicates a structure of the PHR 220 according to the IEEE 802.15.4 standard specification, and a second structure 502, a third structure 503, and a fourth structure 504 may indicate a structure of the PHR 220 according to various embodiments.

Referring to the first structure 501, the PHR 220 may consist of 19 bits according to the standard specification. The PHR 220 may consist of bit No. 0 (a 1st bit), bit No. 1 (a 2nd bit), . . . , bit No 18 (a 19th bit). Bits No. 0 and 1 may indicate a data rate field, bits No. 2 to 8 may indicate a frame length field, bit No. 9 may indicate a ranging field, bit No. 10 may indicate a reserved field, bits No. 11 and 12 may indicate a preamble duration field, and bits No. 13 to 18 may indicate a single error correct, double error detect (SECDED) field.

The data rate field may indicate a date rate of a received PSDU (e.g., 230 of FIG. 2). The frame length field may indicate the number of octets of the PSDU. The ranging field may indicate whether a current frame (e.g., first data or second data of FIG. 3) is used in a ranging procedure (a distance measurement procedure). The reserved field may fail to include information. The preamble duration field may indicate a length of a preamble. The SECDED field may be used to detect an error of the PHR 220.

According to an embodiment, mode information (e.g., a preamble mode) associated with control of the preamble may be included in bit No. 12 (a 13th bit) of the PHR 220. For example, as shown in the second structure 502, the PHR 220 may fail to include a reserved field and a preamble duration field. In this case, bits No. 2 to 10 may indicate a frame length field, field No. 11 may indicate a ranging field, and field No. 12 may indicate mode information associated with the control of the preamble. For another example, as shown in the third structure 503, the PHR 220 may fail to include a ranging field, a reserved field, and a preamble duration field. In this case, bits No. 2 to 11 may indicate a frame length field, and field No. 12 may indicate mode information associated with the control of the preamble. For another example, the PHR 220 may fail to include a data rate field, a preamble duration field, and a SECDED field. In this case, bit No. 0 may include a reserved field, bits No. 1 to 10 may include a frame length field, bit No. 11 may include a ranging field, and field No. 12 may include mode information associated with the control of the preamble.

Figure 6:
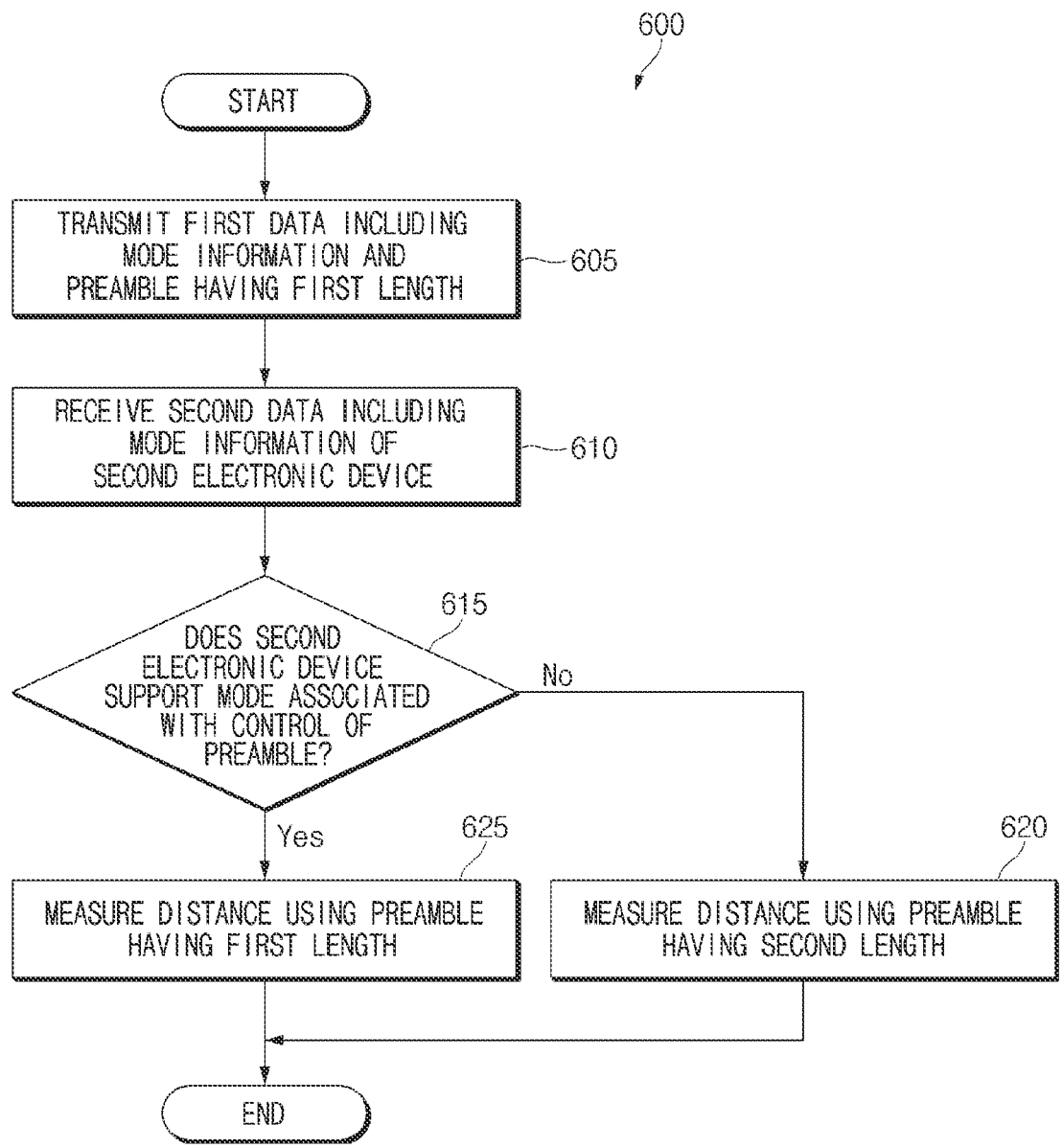
FIG. 6 illustrates an operational flowchart of a first electronic device for controlling a length of a preamble according to various embodiments.

FIG. 6 illustrates an operational flowchart 600 of an electronic device 301 for controlling a length of a preamble according to various embodiments. The operational flowchart 600 shown in FIG. 6 and operational flowcharts described below may be performed by the first electronic device 301 or a second electronic device 302 and may be performed by a PHY layer (e.g., 402 or 404 of FIG. 4) included in the first electronic device 301 or the second electronic device 302.

Referring to FIG. 6, in operation 605 of the operational flowchart 600, the first electronic device 301 may transmit first data including mode information associated with control of a preamble of the first electronic device 301 and a preamble having a first length to the second electronic device 302.

In operation 610, the first electronic device 301 may receive second data including mode information associated with the control of the preamble of the second electronic device 302 from the second electronic device 302. According to an embodiment, the mode information associated with the control of the preamble included in the first data or the second data may be inserted as 1 bit in a PHR (e.g., 220 of FIG. 2). For example, the mode information associated with the control of the preamble may be inserted into bit No. 12 in the PHR 220.

In operation 615, the first electronic device 301 may identify whether the second electronic device 302 supports a mode associated with the control of the preamble based on the mode information associated with the control of the preamble, which is included in the second data. For example, when the second electronic device 302 supports the mode associated with the control of the preamble, the mode information associated with the control of the preamble may indicate '1'. When the second electronic device 302 does not support the mode associated with the control of the preamble, the mode information associated with the control of the preamble may indicate '0'.

When the second electronic device 302 does not support the mode associated with the control of the preamble, in operation 620, the first electronic device 301 may measure a distance between the first electronic device 301 and the second electronic device 302 using the preamble having the first length.

When the second electronic device 302 supports the mode associated with the control of the preamble, in operation 625, the first electronic device 301 may measure a distance between the first electronic device 301 and the second electronic device 302 using a preamble having a second length different from the first length. According to an embodiment, the first electronic device 301 may set the second length based on a state of wireless communication between the first electronic device 301 and the second electronic device 302.

Figure 7A:
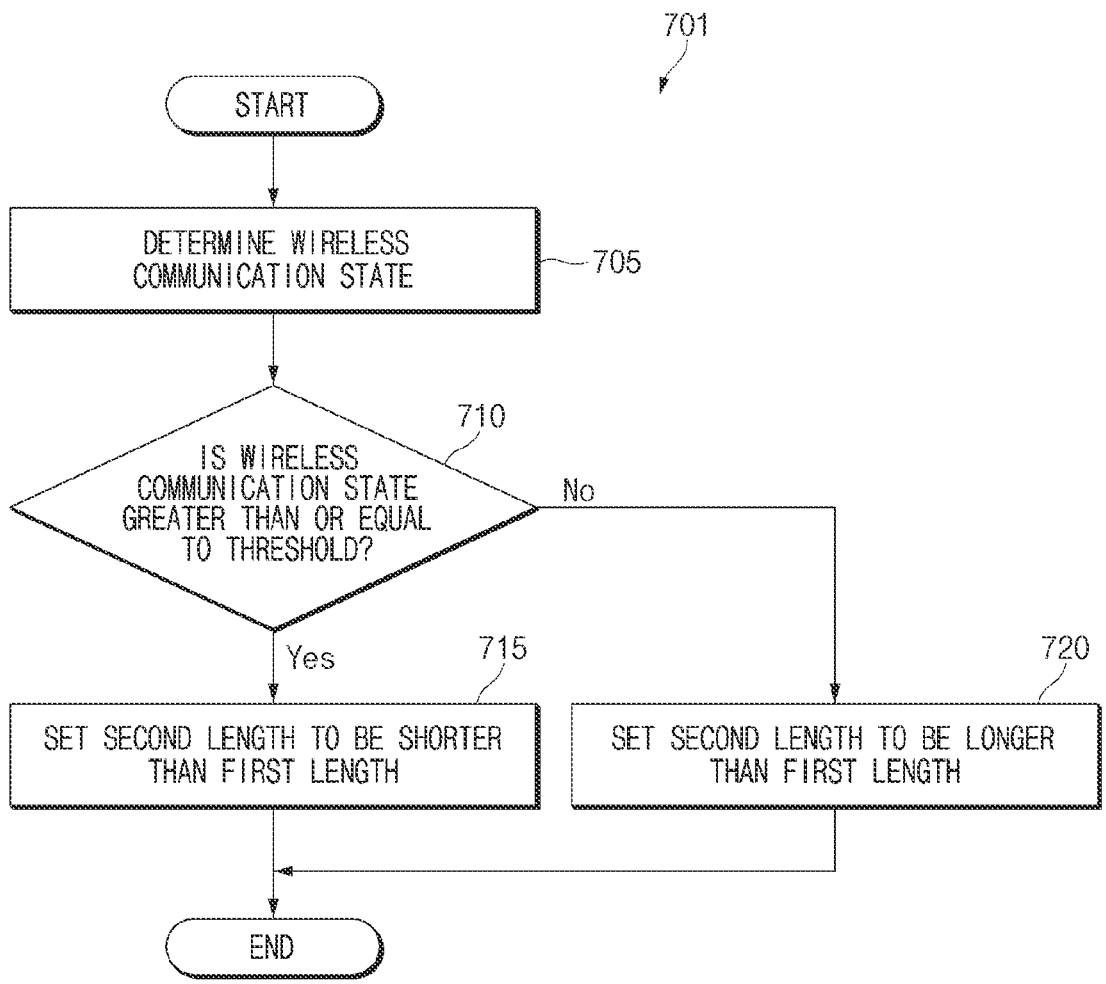
FIG. 7A illustrates an operational flowchart of a first electronic device for determining a state of wireless communication based on a threshold according to various embodiments.
Figure 7B:
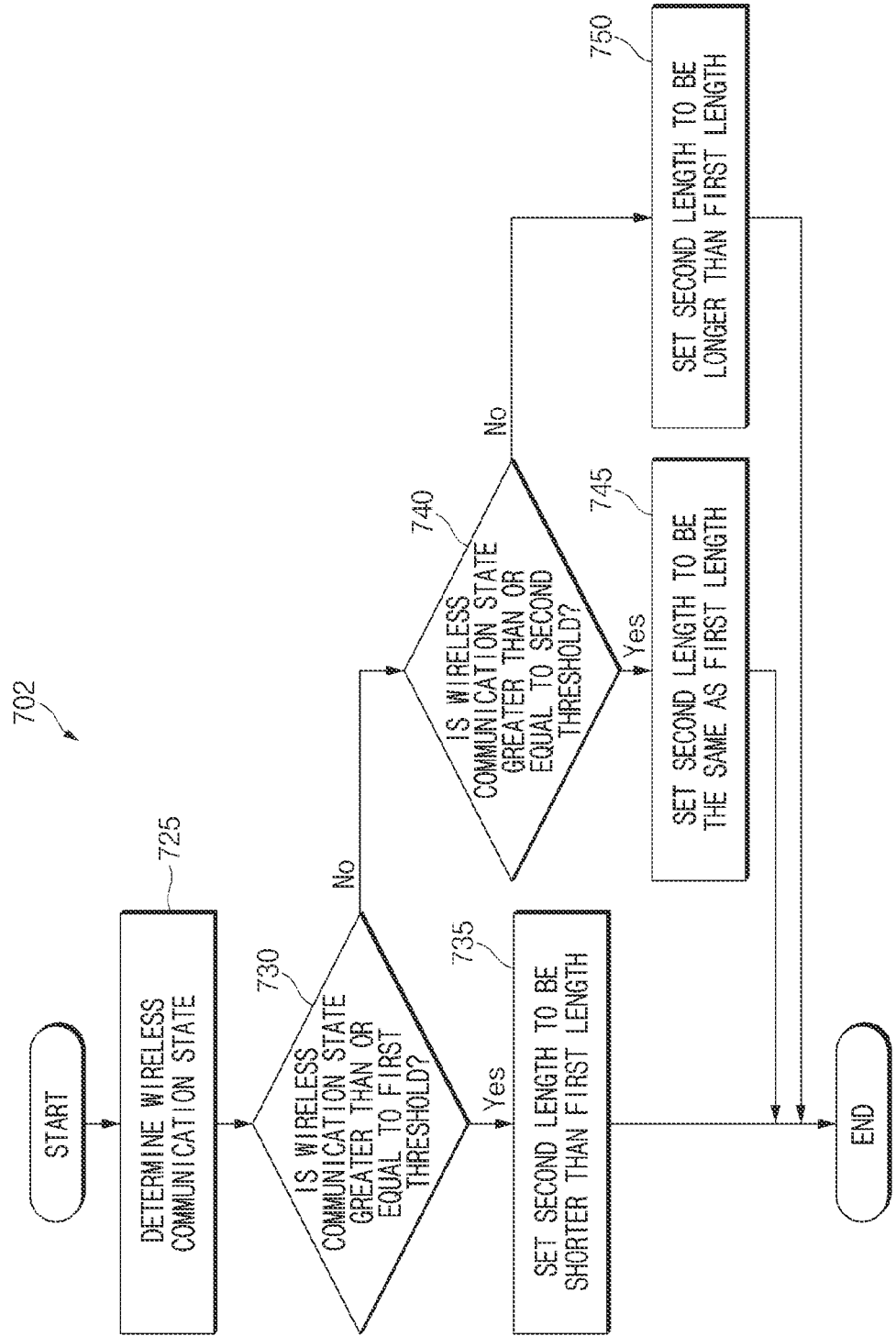
FIG. 7B illustrates an operational flowchart of a first electronic device for determining a state of wireless communication based on a plurality of thresholds according to various embodiments.

FIGS. 7A and 7B illustrate operational flowcharts 701 and 702 of a first electronic device 301 for determining a state of wireless communication according to various embodiments. FIG. 7A illustrates the operational flowchart 701 of the first electronic device 301 for determining the state of the wireless communication based on a single threshold. FIG. 7B illustrates the operational flowchart 702 of the first electronic device 301 for determining the state of the wireless communication based on a plurality of thresholds. Operations shown in FIGS. 7A and 7B may refer to an embodiment of operation 625 of FIG. 6.

According to an embodiment, the first electronic device 301 may determine a state of wireless communication based on at least one of a CL or a ratio between a first path and noise in a CIR of the preamble. For example, the CL value may be represented as Table 3 below.

TABLE 3

| CL | bit 2 | bit 1 | bit 0 |
|---|---|---|---|
| Reserved | 0 | 0 | 0 |
| Reserved | 0 | 0 | 1 |
| 55% | 0 | 1 | 0 |
| Reserved | 0 | 1 | 1 |
| 85% | 1 | 0 | 0 |
| 92% | 1 | 0 | 1 |
| Reserved | 1 | 1 | 0 |
| 99% | 1 | 1 | 1 |

In Table 3, reserved may mean that there is no information. The higher the CL value, the higher the accuracy of distance measurement between the first electronic device 301 and the second electronic device 302. The lower the CL value, the lower the accuracy of measurement device between the first electronic device 301 and the second electronic device 302.

Referring to FIG. 7A, in operation 705 of the operational flowchart 701, the first electronic device 301 may determine a state of wireless communication between the first electronic device 301 and the second electronic device 302. According to an embodiment, the state of the wireless communication may be determined based on at least one of the CL or the ratio of the first path to the noise. An embodiment of determining the wireless communication state will be described below in FIG. 8.

In operation 710, the first electronic device 301 may identify whether the state of the wireless communication is greater than or equal to a specified threshold. For example, when the first electronic device 301 determines the state of the wireless communication based on the CL value, the threshold may be a CL value (e.g., 55%) shown in Table 3 or may be a value (e.g. 50%) which is not shown in Table 3. When the state of the wireless communication is greater than or equal to the threshold, in operation 715, the first electronic device 301 may set the length of the preamble such that a second length is shorter than a first length. When the state of the wireless communication is less than the threshold, in operation 720, the first electronic device 301 may set the length of the preamble such that the second length is longer than the first length.

Referring to FIG. 7B, the first electronic device 301 may determine the state of wireless communication based on a plurality of thresholds. According to an embodiment, a second threshold may be a value less than a first threshold. For example, when the first electronic device 301 determines the state of the wireless communication based on the CL value, the first threshold may be 85% and the second threshold may be 55%.

In operation 725 of the operational flowchart 702, the first electronic device 301 may determine the state of wireless communication.

In operation 730, the first electronic device 301 may identify whether the state of the wireless communication is greater than or equal to the first threshold based on the CL value. When the state of the wireless communication is greater than or equal to the first threshold, in operation 735, the first electronic device 301 may set the length of the preamble such that the second length is shorter than the first length.

When the state of the wireless communication is less than the first threshold, in operation 740, the first electronic device 301 may identify whether the state of the wireless communication is greater than or equal to the second threshold. When the state of the wireless communication is greater than or equal to the second threshold, in operation 745, the first electronic device 301 may set the length of the preamble such that the second length is the same as the first length. When the state of the wireless communication is less than the second threshold, in operation 750, the first electronic device 301 may set the length of the preamble such that the second length is longer than the first length.

Figure 8:
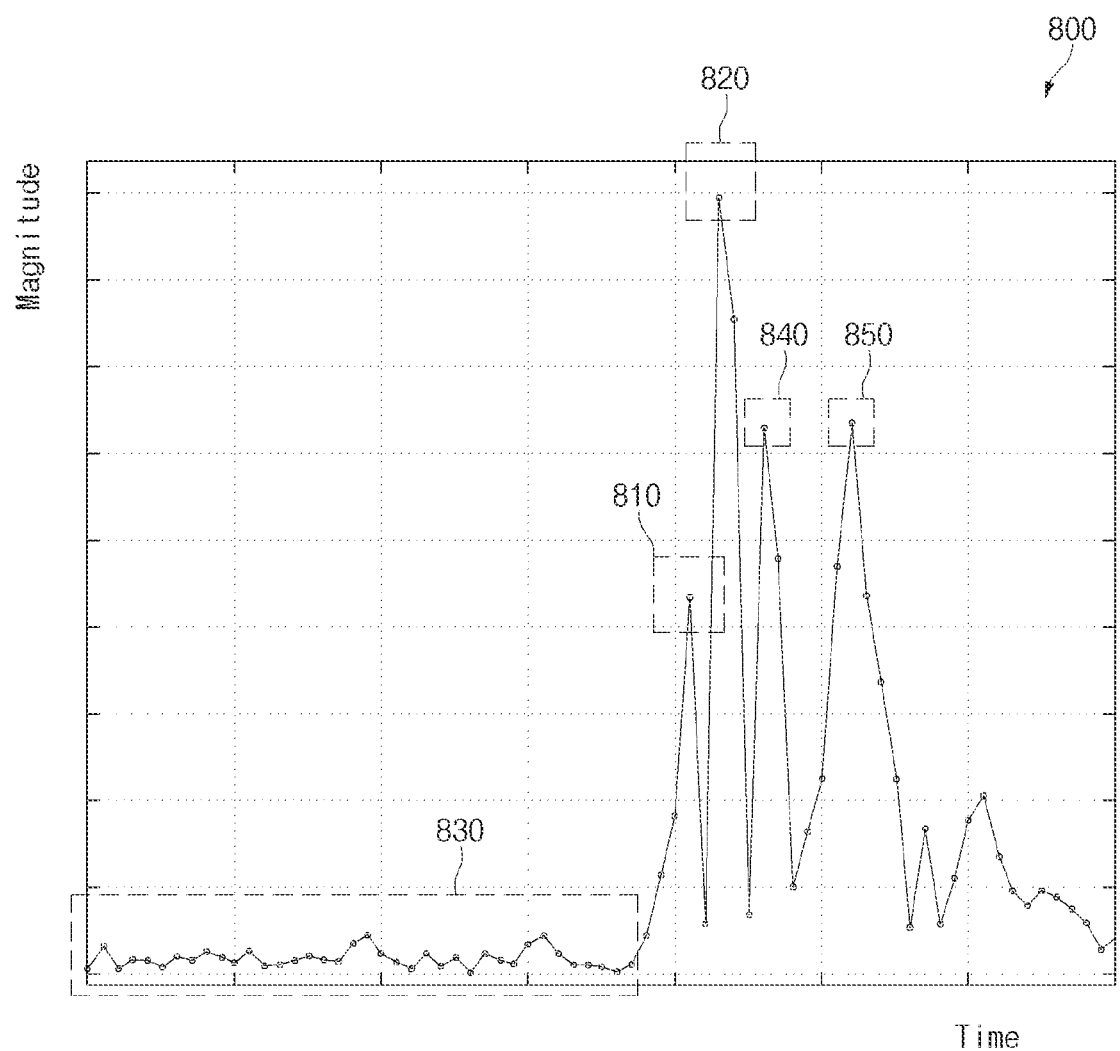
FIG. 8 illustrates a graph indicating a channel impulse response (CIR) according to various embodiments.

FIG. 8 illustrates a graph 800 indicating a channel impulse response (CIR) according to various embodiments. A CIR of a preamble indicated by the graph 800 of FIG. 8 is merely illustrative, and a first path (e.g., 810) of the CIR, a peak path (e.g., 820), the number of paths (e.g., 810, 820, 840, or 850), each of which has a magnitude of a specified value or more, and noise 830 are not limited to the example shown in FIG. 8.

Referring to FIG. 8, the horizontal axis on the graph 800 may indicate time, and the vertical axis may indicate magnitude. An electronic device (e.g., a first electronic device 301 of FIG. 3) may measure a distance by means of the graph 800 or may calculate a CL or the ratio of a first path (e.g., 810) to noise (e.g., at least one of values indicated in 830).

According to the IEEE 802.15.4 standard specification, the CL may refer to a probability that a leading edge (e.g., 810) will arrive during a specified time interval (e.g., a confidence interval (CI)). For example, the electronic device 301 may calculate a difference between the first path (e.g., 810) and the peak path (e.g., 820) using Equation 1 below.

$$IDiff = |\text{magnitude of first path} - \text{magnitude of peak path}| \quad \text{[Equation 1]}$$

The first electronic device 301 may calculate the CL using the calculated IDiff and a predetermined formula. According to an embodiment, the first electronic device 301 may determine a state of wireless communication based on the determined CL value.

According to another embodiment, the first electronic device 301 may control the preamble based on a data rate without using the CIR of the preamble shown in the graph 800. For example, the first electronic device 301 may set a second length based on a relationship between the data rate and the length of the preamble shown in Table 1. For example, when the length of the current frame is 64 symbols and when the data rate changes from 6.8 Mbps to 850 kbps, the first electronic device 301 may determine the length of the preamble such that the second length becomes 1024 symbols.

Figure 9:
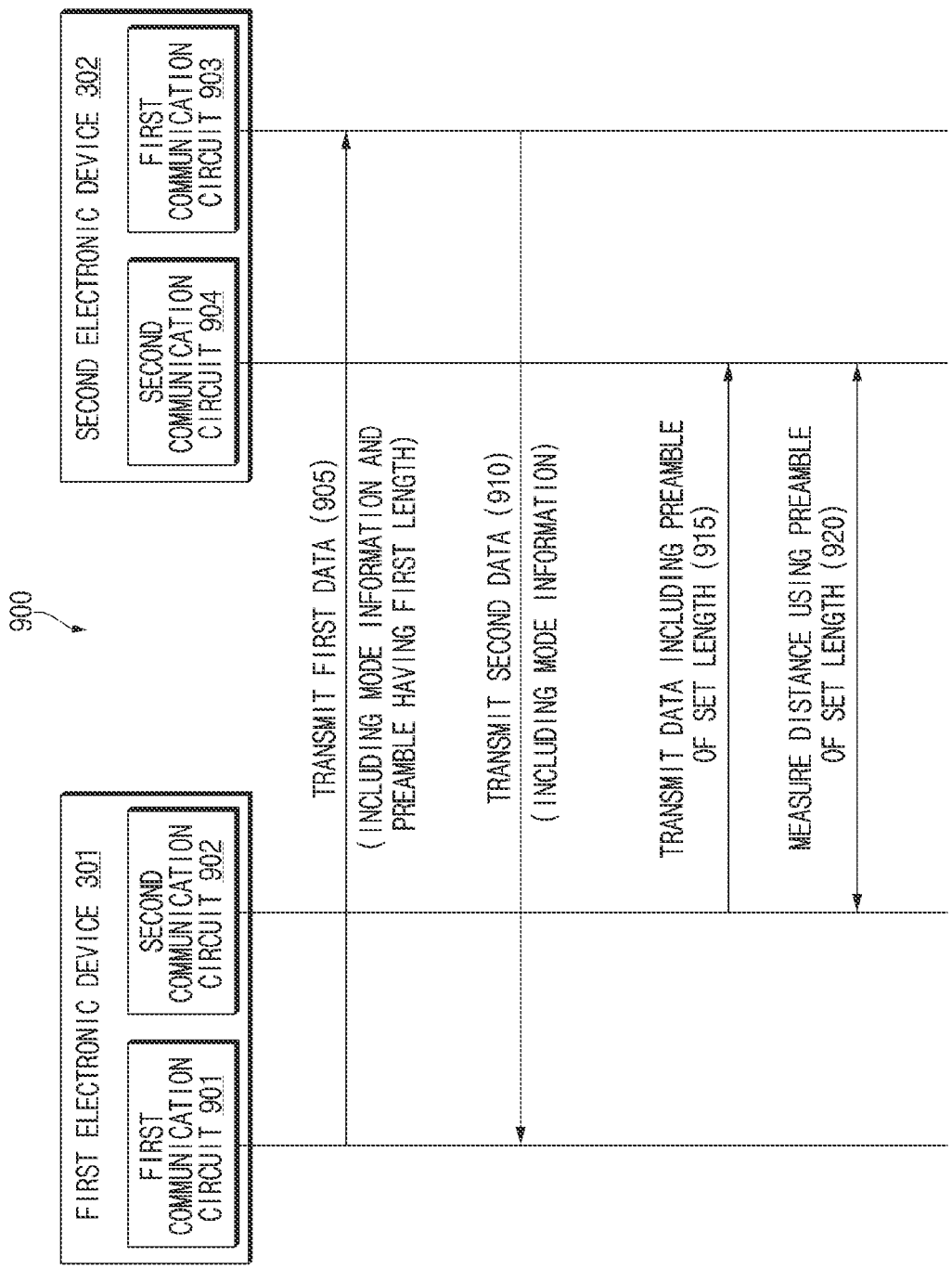
FIG. 9 illustrates a signal sequence diagram between electronic devices including first communication circuits and second communication circuits configured to control a length of a preamble according to various embodiments.

FIG. 9 illustrates a signal sequence diagram 900 between electronic devices 301 and 302 including first communication circuits 901 and 903 and second communication circuits 902 and 904 configured to control a length of a preamble according to various embodiments.

Referring to FIG. 9, the first electronic device 301 may include the first communication circuit 901 and the second communication circuit 902, and the second electronic device 302 may include the first communication circuit 903 and the second communication circuit 904. The first communication circuit 901 or 903 and the second communication circuit 902 or 904 may correspond to at least a part of a communication module 190 of FIG. 1.

According to an embodiment, the first communication circuit 901 or 903 may support another protocol (e.g., at least one of Bluetooth, Bluetooth low energy (BLE), wireless fidelity (Wi-Fi), neighborhood area network (NAN) or near field communication (NFC)) except for a UWB protocol. According to an embodiment, the second communication circuit 902 or 904 may support the UWB protocol.

According to an embodiment, because it is able for power consumption of the second communication circuit 902 or 904 to be greater than power consumption of the first communication circuit 901 or 903, the first electronic device 301 may reduce power consumption by transmitting or receiving mode information associated with control of a preamble with the second electronic device 302 based on the first communication circuit 901 and the other protocol except for the UWB protocol prior to measuring a distance from the second electronic device 302 based on the second communication circuit 902 and the UWB protocol. For example, the first electronic device 301 and/or the second electronic device 302 may disable the second communication circuit 902 and/or the second communication circuit 904 while performing operation 905 and operation 910. According to an embodiment, the first electronic device 301 and the second electronic device 302 may enable the first communication circuits 910 and 903 only while performing operation 905 and operation 910, may disable the first communication circuits 901 and 903 after operation 910, and may enable the second communication circuits 902 and 904. According to another embodiment, the first electronic device 301 and the second electronic device 302 may fail to disable the first communication circuits 901 and 903 during operations 915 and 920.

In operation 905, the first device 301 may transmit first data via the first communication circuit 901 (e.g., operation 305 of FIG. 3). The second device 302 may receive the first data via the first communication circuit 903.

In operation 910, the second electronic device 302 may transmit second data via the first communication circuit 903 (e.g., operation 310 of FIG. 3). The first electronic device 301 may receive the second data via the first communication circuit 901.

In operation 915, the first electronic device 301 may transmit data including a preamble of a length set based on a state of wireless communication (or a data rate) to the second communication circuit 904 of the second electronic device 302 via the second communication circuit 902 (e.g., operation 425 of FIG. 4).

In operation 920, the first electronic device 301 may measure a distance between the first electronic device 301 and the second electronic device 302 using the preamble of the set length by means of the second communication circuit 902 (e.g., operation 320 or 325 of FIG. 3).

Figure 10:
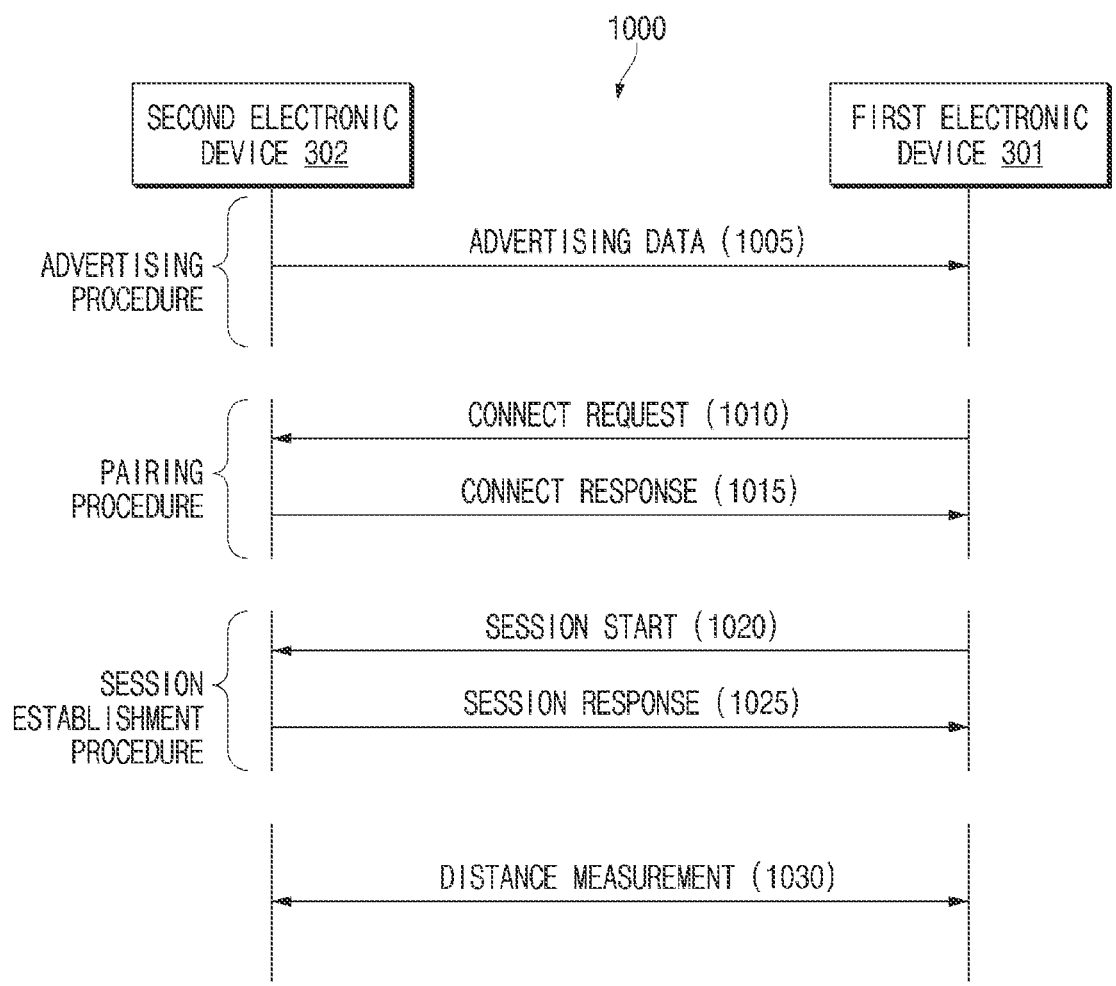
FIG. 10 illustrates a signal sequence diagram between electronic devices according to Bluetooth or Bluetooth low energy (BLE) standards according to various embodiments.

FIG. 10 illustrates a signal sequence diagram 1010 between electronic devices according to Bluetooth or BLE standards according to various embodiments. At least one of operations shown in FIG. 10 may be an embodiment of operation 905 or operation 910 of FIG. 9.

Referring to FIG. 10, a first electronic device 301 and a second electronic device 302 may perform an advertising procedure, a pairing procedure, and a session establishment procedure. The advertising procedure may include operation 1005. The paring procedure may include operations 1010 and 1015. The session establishment procedure may include operation 1020 and 1025.

In operation 1005, the second electronic device 302 may transmit advertising data. The advertising data may include control information used in the pairing procedure. For example, the advertising data may include at least one of a device name of the second electronic device 302, an application identifier (ID), or a MAC ID. According to an embodiment, the advertising data may be broadcast. According to an embodiment, the first electronic device 301 may periodically perform scanning to receive advertising data transmitted by the second electronic device 302.

In operation 1010, the first electronic device 301 may transmit a connect request message to the second electronic device 302. The connect request message may include at least one of, for example, information associated with timing for data transmission or information for encryption.

In operation 1015, the second electronic device 302 may transmit a connect response message to the first electronic device 301 in response to receiving the connect request message from the first electronic device 301.

In operation 1020, the first electronic device 301 may transmit a session start message to establish a session with the second electronic device 302. According to an embodiment, the session start message may include at least one of channel information, a session ID, or a data rate.

In operation 1025, the second electronic device 302 may transmit a session response message to the first electronic device 301 in response to receiving the session start message from the first electronic device 301.

In operation 1030, the first electronic device 301 and the second electronic device 302 may measure a distance based on a UWB protocol (e.g., operation 920 of FIG. 9). According to an embodiment, the first electronic device 301 and the second electronic device 302 may measure a distance based on information obtained through the advertising procedure, the pairing procedure, and the session establishment procedure.

According to an embodiment, at least one of a length of a preamble, a base CL value, or mode information associated with control of the preamble may be included in a message (or data) transmitted in operations 1005 to 1025. For example, the first electronic device 301 may insert at least one of the length of the preamble, the base CL value, or the mode information associated with the control of the preamble into the session start message. When the session start message includes the mode information associated with the control of the preamble of the first electronic device 301, the second electronic device 302 may insert the mode information associated with the control of the preamble of the second electronic device 302 into the session response message. According to an embodiment, at least one of the length of the preamble, the base CL value, or the mode information associated with the control of the preamble may be included in a payload field in the data packet according to Bluetooth or BLE standards.

As described above, an electronic device (e.g., an electronic device 301 of FIG. 3) for supporting a UWB protocol may include at least one wireless communication circuit (e.g., at least a part of a wireless communication module 192 of FIG. 1, a first communication circuit 901 of FIG. 9, or a second communication circuit 902 of FIG. 9) and a processor (e.g., a processor 120 of FIG. 1) operatively connected with the at least one wireless communication circuit. The processor may be configured to transmit first data, including mode information indicating whether the electronic device supports a mode associated with control of a preamble (e.g., a SYNC 212 of FIG. 2) and a preamble having a first length, to an external electronic device (e.g., a second electronic device 302 of FIG. 3), via the at least one wireless communication circuit, receive second data including mode information indicating whether the external electronic device supports the mode associated with the control of the preamble from the external electronic device, via the at least one wireless communication circuit, measure a distance between the electronic device and the external electronic device using the preamble having the first length, when the external electronic device does not support the mode associated with the control of the preamble, based on the mode information included in the second data, and measure a distance between the electronic device and the external electronic device using a preamble having a second length different from the first length, when the external electronic device supports the mode associated with the control of the preamble, based on the mode information included in the second data.

According to an embodiment, the processor may be configured to determine a state of wireless communication between the electronic device and the external electronic device, set the second length to be shorter than the first length, when the state of the wireless communication is greater than or equal to a specified threshold, and set the second length to be longer than the first length, when the state of the wireless communication is less than the threshold.

According to an embodiment, the first data and the second data may include a PHY layer packet (e.g., a PHY layer packet 200 of FIG. 2) defined in the IEEE 802.15.4 standard specification, and the preamble having the first length or the second length may be included in the PHY layer packet.

According to an embodiment, the PHY layer packet may further include a field (e.g., a PHR 220 of FIG. 2) indicating control information, and the mode information may be inserted as 1 bit into the field.

According to an embodiment, the at least one wireless communication circuit may further support at least one of a Bluetooth, BLE, Wi-Fi, NAN, or NFC protocol, and the processor may be configured to transmit the first data in a session establishment procedure based on at least one of the Bluetooth, BLE, Wi-Fi, NAN, or NFC protocol, via the at least one wireless communication circuit.

According to an embodiment, the processor may be configured to determine a state of wireless communication between the electronic device and the external electronic device, set the second length to be shorter than the first length, when the state of the wireless communication is greater than or equal to a specified first threshold, set the second length to be the same as the first length, when the state of the wireless communication is less than the first threshold and is greater than or equal to a specified second threshold, and set the second length to be longer than the first length, when the state of the wireless communication is less than the second threshold.

According to an embodiment, the processor may be configured to determine the state of the wireless communication using a CIR of the preamble having the first length.

According to an embodiment, the processor may be configured to determine the state of the wireless communication using a first path (e.g., 810 of FIG. 8) of the CIR.

As described above, an electronic device (e.g., an electronic device 301 of FIG. 3) may include a first wireless communication circuit (e.g., a second communication circuit 902 of FIG. 9) configured to support a first protocol, a second wireless communication circuit (e.g., a first communication circuit 901 of FIG. 9) configured to support a second protocol, and a processor (e.g., a processor 120 of FIG. 1) configured to be operatively connected with the first wireless communication circuit and the second wireless communication circuit. The processor may be configured to transmit first data, including mode information indicating whether the electronic device supports a mode associated with control of a preamble (e.g., a SYNC 212 of FIG. 2) and a preamble having a first length, to an external electronic device (e.g., a second electronic device 302 of FIG. 3), via the second wireless communication circuit, receive second data including mode information indicating whether the external electronic device supports the mode associated with the control of the preamble from the external electronic device, via the second wireless communication circuit, measure a distance between the electronic device and the external electronic device using the preamble having the first length, via the first wireless communication circuit, when the external electronic device does not support the mode associated with the control of the preamble, based on the mode information included in the second data, and measure a distance between the electronic device and the external electronic device using a preamble having a second length different from the first length, via the first wireless communication circuit, when the external electronic device supports the mode associated with the control of the preamble, based on the mode information included in the second data.

According to an embodiment, the processor may be configured to determine a state of wireless communication between the electronic device and the external electronic device, set the second length to be shorter than the first length, when the state of the wireless communication is greater than or equal to a specified threshold, and set the second length to be longer than the first length, when the state of the wireless communication is less than the threshold.

According to an embodiment, the first data and the second data may include a PHY layer packet (e.g., a PHY layer packet 200 of FIG. 2) defined in the IEEE 802.15.4 standard specification, and the preamble having the first length or the second length may be included in the PHY layer packet.

According to an embodiment, the first protocol may include a UWB protocol, the second protocol may include at least one of a Bluetooth, BLE, Wi-Fi, NAN, or NFC protocol, and the PHY layer packet may further include a field (a PHR 220 of FIG. 2) indicating control information, and the mode information may be inserted as 1 bit into the field.

According to an embodiment, the processor may be configured to determine a state of wireless communication between the electronic device and the external electronic device, set the second length to be shorter than the first length, when the state of the wireless communication is greater than or equal to a specified first threshold, set the second length to be the same as the first length, when the state of the wireless communication is less than the first threshold and is greater than or equal to a specified second threshold, and set the second length to be longer than the first length, when the state of the wireless communication is less than the second threshold.

According to an embodiment, the processor may be configured to determine the state of the wireless communication using a CIR of the preamble having the first length.

According to an embodiment, the processor may be configured to determine the state of the wireless communication using a first path (e.g., 810 of FIG. 8) of the CIR.

As described above, an electronic device (e.g., a second electronic device 302 of FIG. 3) for supporting a UWB protocol may include at least one wireless communication circuit (e.g., at least a part of a wireless communication module 192 of FIG. 1, a first communication circuit 903 of FIG. 9, or a second communication circuit 904 of FIG. 9) and a processor (e.g., a processor 120 of FIG. 1) operatively connected with the at least one wireless communication circuit. The processor may be configured to receive first data, including mode information indicating whether an external electronic device (e.g., a first electronic device 301 of FIG. 3) supports a mode associated with control of a preamble (e.g., a SYNC 212 of FIG. 2) and a preamble having a first length, from the external electronic device, via the at least one wireless communication circuit, transmit second data including mode information indicating whether the electronic device supports the mode associated with the control of the preamble to the external electronic device, via the at least one wireless communication circuit, measure a distance between the electronic device and the external electronic device using the preamble having the first length, when the electronic device does not support the mode associated with the control of the preamble, based on the mode information included in the second data, and measure a distance between the electronic device and the external electronic device using a preamble having a second length different from the first length, when the electronic device supports the mode associated with the control of the preamble.

According to an embodiment, the first data and the second data may include a PHY layer packet (e.g., a PHY layer packet 200 of FIG. 2) defined in the IEEE 802.15.4 standard specification, and the preamble having the first length or the second length may be included in the PHY layer packet.

According to an embodiment, the PHY layer packet may further include a field (e.g., a PHR 220 of FIG. 2) indicating control information, and the mode information may be inserted as 1 bit into the field.

According to an embodiment, the at least one wireless communication circuit may support at least one of a Bluetooth, BLE, Wi-Fi, NAN, or NFC protocol, and the processor may be configured to receive the first data in a session establishment procedure based on at least one of the Bluetooth, BLE, Wi-Fi, NAN, or NFC protocol, via the at least one wireless communication circuit.

According to an embodiment, the at least one wireless communication circuit may include a first wireless communication circuit (e.g., the second communication circuit 904 of FIG. 9) configured to support the UWB protocol and a second wireless communication circuit (e.g., the first communication circuit 903 of FIG. 9) configured to support at least one of the Bluetooth, BLE, Wi-Fi, NAN, or NFC protocol.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device for supporting an ultra wide band (UWB), the electronic device comprising:
at least one wireless communication circuit; and
a processor operatively connected with the at least one wireless communication circuit,
wherein the processor is configured to:
transmit first data, including mode information indicating whether the electronic device supports a mode associated with control of a preamble and a preamble having a first length, to an external electronic device, via the at least one wireless communication circuit;
receive second data including mode information indicating whether the external electronic device supports the mode associated with the control of the preamble from the external electronic device, via the at least one wireless communication circuit;
measure a distance between the electronic device and the external electronic device using the preamble having the first length, when the external electronic device does not support the mode associated with the control of the preamble, based on the mode information included in the second data; and
measure a distance between the electronic device and the external electronic device using a preamble having a second length different from the first length, when the external electronic device supports the mode associated with the control of the preamble, based on the mode information included in the second data.

2. The electronic device of claim 1, wherein the processor is configured to:
determine a state of wireless communication between the electronic device and the external electronic device;
set the second length to be shorter than the first length, when the state of the wireless communication is greater than or equal to a specified threshold; and
set the second length to be longer than the first length, when the state of the wireless communication is less than the threshold.

3. The electronic device of claim 1, wherein the first data and the second data include a physical (PHY) layer packet defined in the institute of electrical and electronic engineers (IEEE) 802.15.4 standard specification, and
wherein the preamble having the first length or the second length is included in the PHY layer packet.

4. The electronic device of claim 3, wherein the PHY layer packet further includes a field indicating control information, and
wherein the mode information is inserted as 1 bit into the field.

5. The electronic device of claim 3, wherein the at least one wireless communication circuit further supports at least one of a Bluetooth, Bluetooth low energy (BLE), wireless fidelity (Wi-Fi), neighborhood area network (NAN), or near field communication (NFC) protocol,
wherein the processor is configured to:
transmit the first data in a session establishment procedure based on at least one of the Bluetooth, BLE, Wi-Fi, NAN, or NFC protocol, via the at least one wireless communication circuit.

6. The electronic device of claim 1, wherein the processor is configured to:
determine a state of wireless communication between the electronic device and the external electronic device;

set the second length to be shorter than the first length, when the state of the wireless communication is greater than or equal to a specified first threshold;

set the second length to be the same as the first length, when the state of the wireless communication is less than the first threshold and is greater than or equal to a specified second threshold; and set the second length to be longer than the first length, when the state of the wireless communication is less than the second threshold.

7. The electronic device of claim 2, wherein the processor is configured to:

determine the state of the wireless communication using a channel impulse response (CIR) of the preamble having the first length.

8. The electronic device of claim 7, wherein the processor is configured to:

determine the state of the wireless communication using a first path of the CIR.

9. An electronic device for supporting an ultra wide band (UWB), the electronic device comprising:

at least one wireless communication circuit; and a processor operatively connected with the at least one wireless communication circuit, wherein the processor is configured to:

receive first data, including mode information indicating whether an external electronic device supports a mode associated with control of a preamble and a preamble having a first length, from the external electronic device, via the at least one wireless communication circuit;

transmit second data including mode information indicating whether the electronic device supports the mode associated with the control of the preamble to the external electronic device, via the at least one wireless communication circuit;

measure a distance between the electronic device and the external electronic device using the preamble having the first length, when the electronic device does not support the mode associated with the control of the preamble, based on the mode information included in the second data; and measure a distance between the electronic device and the external electronic device using a preamble having a second length different from the first length, when the electronic device supports the mode associated with the control of the preamble, based on the mode information included in the second data.

10. The electronic device of claim 9, wherein the first data and the second data include a physical (PHY) layer packet defined in the institute of electrical and electronic engineers (IEEE) 802.15.4 standard specification, and wherein the preamble having the first length or the second length is included in the PHY layer packet.

11. The electronic device of claim 10, wherein the PHY layer packet further includes a field indicating control information, and wherein the mode information is inserted as 1 bit into the field.

12. The electronic device of claim 9, wherein the at least one wireless communication circuit supports at least one of a Bluetooth, Bluetooth low energy (BLE), wireless fidelity (Wi-Fi), neighborhood area network (NAN), or near field communication (NFC) protocol, wherein the processor is configured to:

receive the first data in a session establishment procedure based on at least one of the Bluetooth, BLE, Wi-Fi, NAN, or NFC protocol, via the at least one wireless communication circuit.

13. The electronic device of claim 12, wherein the at least one wireless communication circuitry includes:

a first wireless communication circuit configured to support the UWB protocol; and a second wireless communication circuit configured to support at least one of the Bluetooth, BLE, Wi-Fi, NAN, or NFC protocol.

14. A method of an electronic device for supporting a UWB protocol, the method comprising:

transmitting first data, including mode information indicating whether the electronic device supports a mode associated with control of a preamble and a preamble having a first length, to an external electronic device;

receiving second data including mode information indicating whether the external electronic device supports the mode associated with the control of the preamble from the external electronic device; and measuring a distance between the electronic device and the external electronic device using the preamble having the first length, when the external electronic device does not support the mode associated with the control of the preamble, based on the mode information included in the second data; or measuring a distance between the electronic device and the external electronic device using a preamble having a second length different from the first length, when the external electronic device supports the mode associated with the control of the preamble, based on the mode information included in the second data.

15. The method of claim 14, further comprising:

determining a state of wireless communication between the electronic device and the external electronic device; and setting the second length to be shorter than the first length, when the state of the wireless communication is greater than or equal to a specified threshold, based on the state of the wireless communication state; or setting the second length to be longer than the first length, when the state of the wireless communication is less than the threshold, based on the state of the wireless communication state.

* * * * *